United States Patent
Hu et al.

(10) Patent No.: US 9,686,397 B1
(45) Date of Patent: Jun. 20, 2017

(54) ACOUSTIC-BASED COMMUNICATION BETWEEN DEVICES

(71) Applicant: Samsung Electronics Co., Ltd., Suwon-si, Gyeonggi-do (KR)

(72) Inventors: Pengfei Hu, Mountain View, CA (US); Yilin Shen, Mountain View, CA (US); Hongxia Jin, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/280,325

(22) Filed: Sep. 29, 2016

(51) Int. Cl.
*H04B 11/00* (2006.01)
*H04B 1/38* (2015.01)
*H04M 1/725* (2006.01)
*H04L 12/26* (2006.01)
*H04W 72/04* (2009.01)

(52) U.S. Cl.
CPC ........ *H04M 1/72533* (2013.01); *H04L 43/16* (2013.01); *H04W 72/0446* (2013.01)

(58) Field of Classification Search
CPC . H04B 1/02; H04B 1/06; H04B 10/00; H04B 11/00
See application file for complete search history.

(56) References Cited

U.S. PATENT DOCUMENTS

| | | | |
|---|---|---|---|
| 5,581,654 A | 12/1996 | Tsutsui | |
| 8,818,273 B2 * | 8/2014 | Jung | H04B 11/00 455/41.2 |
| 9,338,002 B2 * | 5/2016 | Jung | H04B 11/00 |
| 2005/0254344 A1 * | 11/2005 | Barras | H04B 11/00 367/76 |
| 2006/0020467 A1 * | 1/2006 | Iwaki | G01C 21/3629 704/258 |
| 2006/0193270 A1 * | 8/2006 | Gehasie | H04B 11/00 370/282 |
| 2007/0265038 A1 | 11/2007 | Kim | |
| 2009/0067292 A1 * | 3/2009 | Matsuoka | H04B 7/0613 367/137 |
| 2010/0182876 A1 * | 7/2010 | Matsuoka | H04B 1/707 367/135 |
| 2012/0134238 A1 * | 5/2012 | Surprenant | H04S 1/007 367/137 |

* cited by examiner

*Primary Examiner* — Blane Jackson
(74) *Attorney, Agent, or Firm* — Beyer Law Group LLP

(57) ABSTRACT

A modulation method referred to as Time Shift Keying (TSK) is used to transmit messages between two devices in a highly energy efficient manner. A message represented by an inaudible audio signal is modulated on a transmitting device. The audio signal is comprised of an array of non-zero amplitude delimiter signals with time periods of zero-amplitude transmission between delimiters. The time duration of the zero-amplitude transmission periods is mapped to a symbol, multiple symbols are then assembled into a message. On the transmitting device, the audio signal is broken into pieces or sequences of bits which are mapped to symbols. On the receiving device, the time durations of zero-amplitude transmission are translated to the symbols which are assembled to the message. The delimiter signals have gradually increasing and decreasing amplitudes and have a length such that make them detectable by the receiving device.

20 Claims, 5 Drawing Sheets

ACOUSTIC-BASED COMMUNICATION BETWEEN DEVICES

FIELD OF THE INVENTION

The present invention relates to acoustic signal-based communication for device interaction. More specifically, it relates to modulation and demodulation of acoustic signals among devices.

BACKGROUND

The proliferation of mobile devices has been occurring for several years. With this growth has been the increased use of acoustic signal-based communications among both mobile and other types of non-mobile devices. This form of interaction requires that the device has a speaker and a microphone. Another characteristic of this type of device interaction is that the speaker on the device always be on in order to transmit acoustic signals. Existing modulation methods for acoustic based interaction between devices include Amplitude Shift Keying, Frequency Shift Keying, Phase Shift Keying, and Quadrature Amplitude Modulation. All these approaches require continuous non-zero amplitude signals. This leads to high power consumption on the device. Furthermore, many of the devices used in these interactions are mobile or wearable devices, such as smartphones, fitness trackers, and the like, which typically do not have long-lasting power sources.

As noted, wearable devices have also been growing in popularity. For these types of device, extending battery life or, conversely, finding ways to preserve power, is becoming increasingly important. These devices have been interacting with other devices using continuous acoustic-signal based communication. They send inaudible sound signals to other devices which requires that the speaker on the device always be powered on in order for it to be continuous. Similarly, the device microphone (or other signal-detecting component) must always be on in order to detect the signal. These components, especially the speaker needed for transmitting the acoustic signals, are the most energy consuming hardware components on the device. As a result, existing continuous acoustic signal communication solutions between devices are relatively high power consuming operations for the devices.

This is especially an issue with smaller mobile devices where energy efficiency is an important factor. Having a speaker always powered on can quickly drain the battery of a device, which is likely to preclude using acoustic communications for interacting with low-power devices. What is needed is an energy efficient solution to enable continuous and real-time acoustic communication for a variety of devices.

SUMMARY

In one aspect of the present invention, a method of communicating a message from a first device to a second device, each device having a speaker and a microphone, is described. A message is divided into multiple pieces or segments on the first device. Each segment is mapped to a symbol, thereby creating multiple symbols. In one embodiment, a symbol is represented by a specific time duration of zero amplitude transmission. A delimiter signal is inserted between two consecutive symbols. This creates a transmission array that is a series of delimiter signals with periods of zero-amplitude transmission between the delimiters. In one embodiment, a delimiter is a non-zero amplitude signal that has a gradually increasing starting amplitude and a similarly gradually decreasing ending amplitude. It may be characterized as a double sideband modulated signal. A first delimiter signal is transmitted or emitted through the speaker of the first device at a recorded time. After a specific time duration, representing one symbol, a second delimiter signal is emitted and this emission time is recorded. This emission of delimiter signals and zero-amplitude emission continues until all the symbols representing the message have been emitted by the speaker of the first device.

In another aspect of the present invention, a method of communicating a message between a transmitting device and a receiving device is described. A receiving device receives an incoming audio signal representing a message through its microphone. Software on the device detects a first delimiter signal in the incoming signal. In one embodiment, this is done using a reference delimiter signal. The device records the time the delimiter signal is detected. A second delimiter signal is then detected after a specific time duration. During this time duration, between two delimiters, there is a period of zero amplitude transmission. This time duration is recorded. The device uses a symbol mapping table implementing a pre-defined protocol to translate the time duration to a distinct symbol. This is done for each of the zero-amplitude time durations in the incoming signal, each one distinguishable by virtue of the delimiter signals. The multiple symbols are assembled to form the message being transmitted by the transmitting device.

BRIEF DESCRIPTION OF THE DRAWINGS

The invention and the advantages thereof, may best be understood by reference to the following description taken in conjunction with the accompanying drawings in which.

DETAILED DESCRIPTION

Methods and systems for implementing continuous communication or interaction between devices that is based on acoustic signals and consumes low amounts of power, thereby conserving battery life, are described in the various figures. The type of device interaction can vary widely. It may be between a wearable device and a mobile device. It may also be between a wearable or mobile device and a larger device, such as a laptop, TV, an appliance or a car. Different applications and areas in which the continuous communication solution of the present invention can be used vary widely and some are described below.

Embodiments of the present invention provide a power efficient method of continuous real time device interaction. One embodiment of the present invention includes modulation and demodulation of ultra-sonic acoustic signals having periods of zero-amplitude transmission where each period is delineated or separated using non-zero delimiter signals, thereby reducing use of the speaker on the device. In this manner, the speaker which transmits the acoustic signals does not have to be on all the time; the only time it is consuming power is when the delimiter signal is being sent. Energy use during zero-amplitude transmission is negligible.

There are certain technical specifications of speakers used in current mobile devices such as phones and smart watches that enable the modulation scheme of the described embodiments. One is that these speakers can play very short sound or signal durations (e.g., <10 ms). Another is that the speakers consume a negligible amount of power when emitting a sound with zero amplitude. Both these characteristics hold true even when the speaker is set at the highest transmission power.

Figure 1:
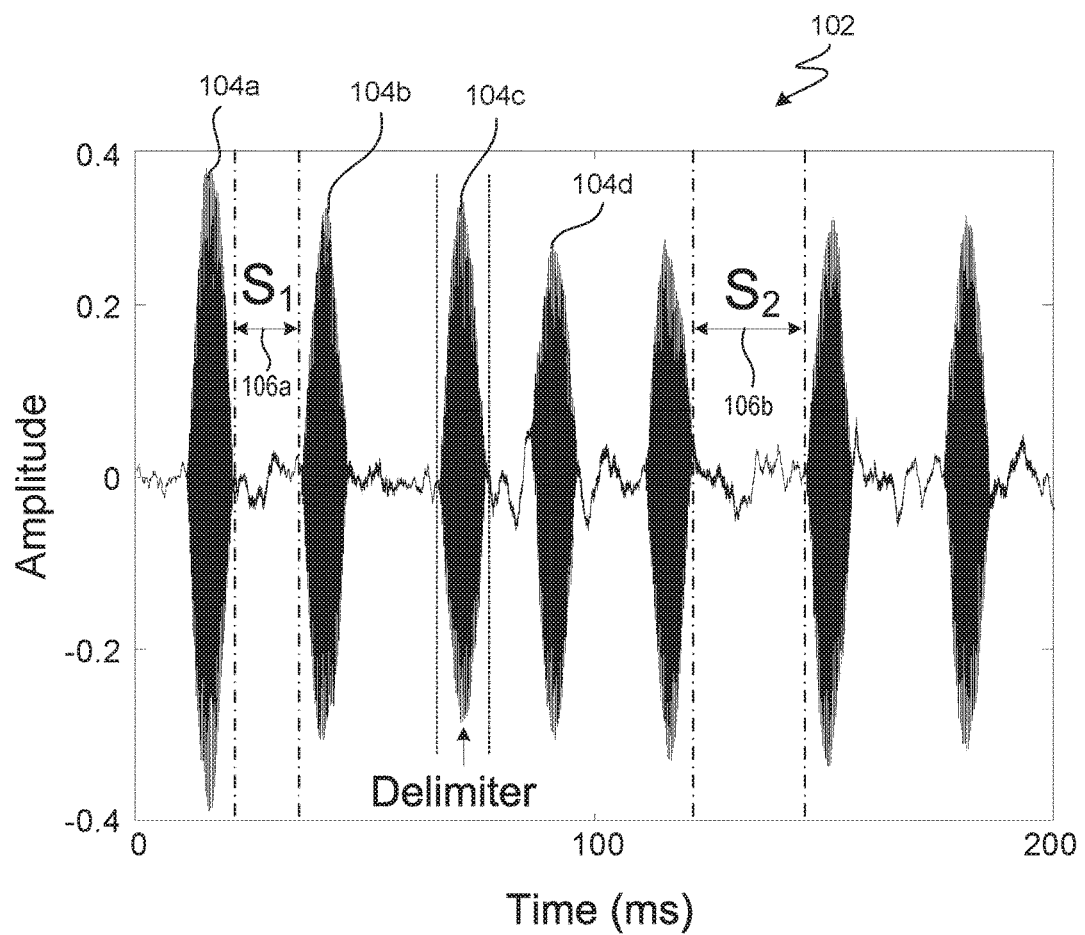
FIG. 1 is a graph diagram showing an outgoing signal using TSK modulation in accordance with one embodiment.

The modulation scheme of the described embodiments may be referred to as time shift keying (TSK) and leverages technical specifications of current speakers as described above. In contrast to traditional schemes which use acoustic signals as symbols, TSK modulates the data (i.e., the message) by using zero-amplitude time durations, separated by non-zero signals, as symbols. FIG. 1 is a graph 102 showing an outgoing signal using TSK modulation in accordance with one embodiment. In this specific example, the y-axis shows amplitude ranging from −0.4 to +0.4 and the x-axis shows time from 0 ms to 200 ms. These values may be different based on various needs. Signals 104a, 104b, 104c . . . are referred to as delimiters, non-zero amplitude signals of short duration and having specific properties as described below. The zero amplitude durations, two of which are shown as $S_1$ 106a and $S_2$ 106b between the non-zero amplitude signals.

In one embodiment of the present invention, the procedures described herein are performed between two devices and may be performed continuously. As such, it is necessary that users of the devices and those nearby do not hear or perceive any sound. This is also true in other applications described below, in which users should not be aware that device interaction or communication is taking place. The delimiter (non-zero signal) should be inaudible to users. In one embodiment, the delimiter may be in the range of 17 KHz to 22 KHz, a range that creates signals that are inaudible to humans. The speakers should not emit any audible artifacts from transitioning from delimiter to zero-amplitude signal.

Embodiments of the present invention can be used in various applications. In one embodiment, a mobile device or a wearable device, such as a smart phone or smart watch is used to interact with a TV. The mobile device acts as a controller device for operation for the TV and for components connected with the TV. A user moves the mobile device while in front of a TV or, more broadly, within acoustic signal detecting distance of the TV's speaker and microphone, to cause operations of the TV, such as change channels or volume, switch applications or play games. Here, the modulation scheme of one embodiment of the present invention can be used to continuously send messages from the mobile device to the TV. In one embodiment, these messages comprise commands derived or translated from sensor date, motions or movement of the controller device for different interactions with the TV. A user will expect these commands to have immediate effects on TV operations; there is a need for having close to real-time interaction with the TV. As such, the transmission time of messages are short. Short messages can be achieved by having short symbols as described below. In one embodiment, when the mobile device is used as an input controller for the TV, it may detect user gesture input based on sensor data captured by motion sensors or other types of sensors to sensors that are coupled to the mobile device. It should be noted that, in one embodiment, the TV does not need to directly detect movement of the mobile device (i.e., user actions). So, for example, the TV does not need to have a camera to monitor user inputs.

The controller device sends commands to the TV in a continuous manner, especially when the TV is in gaming mode. For example, to understand a user interaction at a certain time, when the user's hand is moving, the TV needs to know both the user gestures, such as finger pointing, which can be determined by the controller device, and motions of the gesture in the three-dimensional space, which can be determined based on continuous distance measurement, as described in co-pending U.S. patent application Ser. No. 15/264,116. In one embodiment, the TV has two or more microphones having x,y,z positioning of the controller device determined by the TV or two or more speakers where x,y,z positioning determination of the controller device is performed at the controller device. In the latter case, the controller device can modulate a message comprising positioning of itself in addition to gesture coding (as defined in a symbol table, described below), and send the modulated messages to the TV via acoustic communication. In one embodiment, data fusion, to use the controller device's additional sensor data, may be implemented to help improve accuracy of position determination of the controller device.

Another application involves detecting a position of a device within a space, such as in a vehicle. For example, the interaction may be between a user's device, such as a smart phone or wearable device, and a car. It is becoming increasingly common for a smart device to enter into a "driver mode" automatically when the user of the smart device is in the driver's seat of a car and the car is in motion, for safety and convenience. When the car speakers are powered on (typically when the car ignition is turned on), the location of a device is continuously tracked. When the device is detected in the driver area, the device can prompt a notification asking the user to put it in driver mode, or it can be configured to automatically enter into driver mode. The message between the device and car may contain a short message containing an identifier of the car speaker. In this application the messages are also typically short. The response time need not be immediate or real-time, but should be appropriately responsive.

In one embodiment, when a car is in motion, any device that is determined to be in or near a driving section or space, will be locked. Tracking methods for determining distance are described in co-pending U.S. patent application Ser. No. 15/264,116. In one embodiment, a space, such as the interior of a car, has three or more speakers/microphones installed at known locations. Through known methods, such as triangulation, a device is able to determine its relative position to these speakers/microphones, thus can further determine its position inside the space, such as a driver area in a car.

Another application is in the context of tracking people, such as monitoring activity of seniors or the elderly, by caretakers. This can be especially useful in cases of people having dementia or Alzheimer's disease. In this context, a senior (or anyone having a caregiver) has a tracking device, such as a smart watch or phone. This tracking device is paired with a caregiver's device which may be PC workstation, phone, tablet or other device. The senior's tracking device continuously communicates with the caregiver's device. The messages are modulated to contain the senior device's identification information (e.g., a MAC address). In one embodiment, the message may also contain a location of the tracking device. In another embodiment, the relative distance between the senior's tracking device and the caregiver's device can be determined using the methods described in co-pending U.S. patent application Ser. No. 15/264,116. In this manner, the caregiver's device can keep track of the location of the senior.

As described above, message length may be made or programmed to be suitable based on the context or app. The suitability of a message is basically the length of the message: short messages for sensitive, real-time applications, such as with the TV, and longer messages for applications that do not have real-time interaction needs, such as senior tracking. In one embodiment, there are two ways to control the size of a message between devices.

Figure 2:
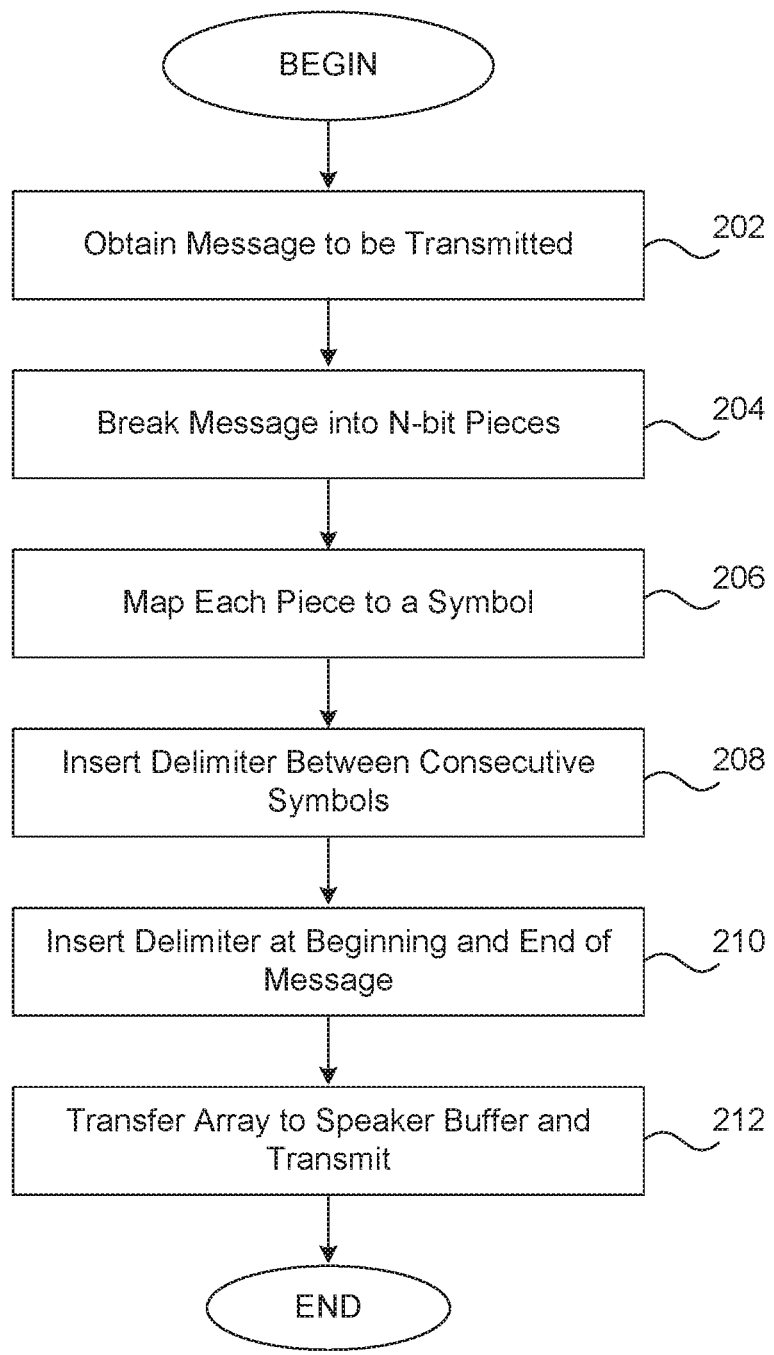
FIG. 2 is a flow diagram of a process of transmitting a message from a device to be received by another device in accordance with one embodiment.

FIG. 2 is a flow diagram of a process of transmitting a message from a device to be received by another device in accordance with one embodiment. As noted, the device may be any type of device that has a microphone and speaker. The energy conserving aspects of the invention are best realized on devices that have limited power and computational capacity, such as smart watches, fitness trackers, phones, and wearable devices. At step 202 the device obtains a message to be transmitted to the other device. For example, this message may be the result of a user pressing a key on a phone to interact with a TV, time information for distance estimation between two devices, or location information for senior tracking. The message is comprised of a number of bits, L, which can vary. A protocol for determining how the bits in the message are determined is described below.

At step 204 the message is segmented into pieces. In one specific embodiment, each piece has $\log_2 N$ bits, where N is a power of two. In another embodiment, there is a simple linear constellation for the symbols. Any suitable segmented piece of various lengths may be selected to break up the message. It may also be noted that segmenting the message into pieces at the bit level does not have to be performed first. In other embodiments, this step may be performed later in the process. At step 206 each piece, having a specific number of bits is mapped to a symbol using a predefined table. In one embodiment, this table or protocol is predetermined between the two devices and/or is based on the type of application. In one embodiment, a symbol is associated with a time duration (e.g., 5 ms, 10 ms, 20 ms, etc.). As an illustration, a 0 bit value maps to a 5 ms symbol, a 1 bit value maps to a 10 ms symbol. In another embodiment, a 00 bit value maps to a 5 ms symbol, a 01 bits value maps to a 15 ms symbol, and so on. This type of customizable table implements a protocol and is used to map each piece (a single bit or short sequence of bits) to a time duration. This time duration, or symbol, is the length of time of the zero-amplitude transmission (i.e., the silence).

At step 208 a non-zero amplitude delimiter signal is inserted between each of the symbols to create what may be referred to as an array. At step 210 a delimiter is inserted at the beginning and end of the array. The array now consists of an initial delimiter, followed by a sequence of zero-amplitude durations separated by non-zero amplitude delimiters and ending with a final delimiter. At this stage, this concatenated array represents the message to be sent to the other device. At step 212 the array or message is transferred to a speaker buffer and transmitted as an outgoing ultra-sonic acoustic signal.

Figure 3:
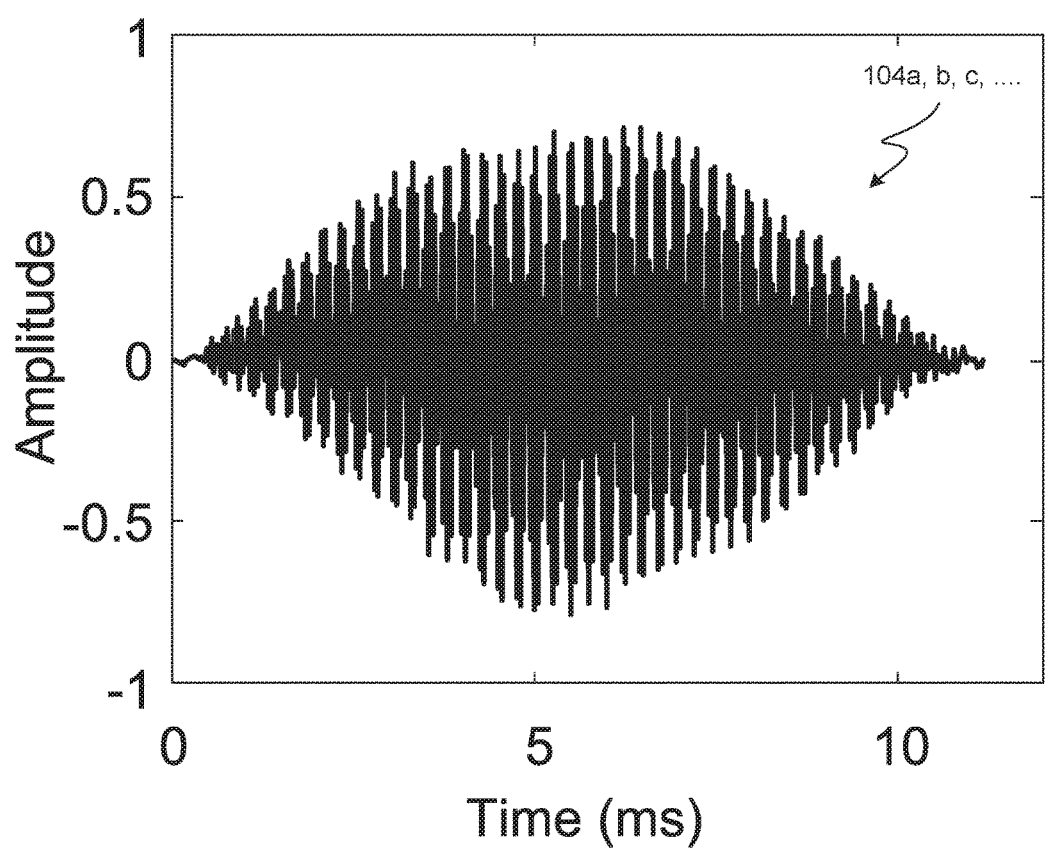
FIG. 3 is a graph diagram showing the shape or wave form of an inter-symbol delimiter in accordance with one embodiment.

FIG. 3 shows the shape or wave form of a delimiter 104a, 104b, 104c in accordance with one embodiment. In one embodiment, the interaction or communication between the devices is continuous, it is important that the users of the devices do not hear or perceive any type of sound, or artifact that may result from actual transmission of the delimiter signals or from the speaker. In one embodiment, the frequency band used for the delimiter signal is [17 KHz to 22 KHz] and is a sinusoid pulse. The delimiter is short yet still recognizable so that the consecutive zero-amplitude time periods are distinguishable to the receiver microphone. If the delimiter is short, there may be residual power that accumulates to the next delimiter, resulting in non-uniform delimiters.

In order to avoid any noise from the speaker, such as clicking, the delimiter has certain characteristics. In one embodiment, it is a double sideband amplitude-modulation signal which has an outline like an envelope where power is concentrated at around 10 KHz. In envelope 104a,b,c, each sample point of the delimiter d[i] is generated using the following equation: $d[i]=A*\sin(2\pi f_c i/f_s)*\sin(2\pi f_m i/f_s)$. Here A is the amplitude, $f_c$ is the carrier frequency of the acoustic signal while $f_m$ is the modulation frequency of the envelop signal, $f_s$ is the sampling rate (44.1 kHz in the described embodiment). The signal has a gradually increasing start and, similarly, a gradually decreasing end. In one embodiment, the time length of the delimiter is 10 ms. These characteristics reduce any audible artifacts, such as a clicking noise, at lower frequencies.

Figure 4:
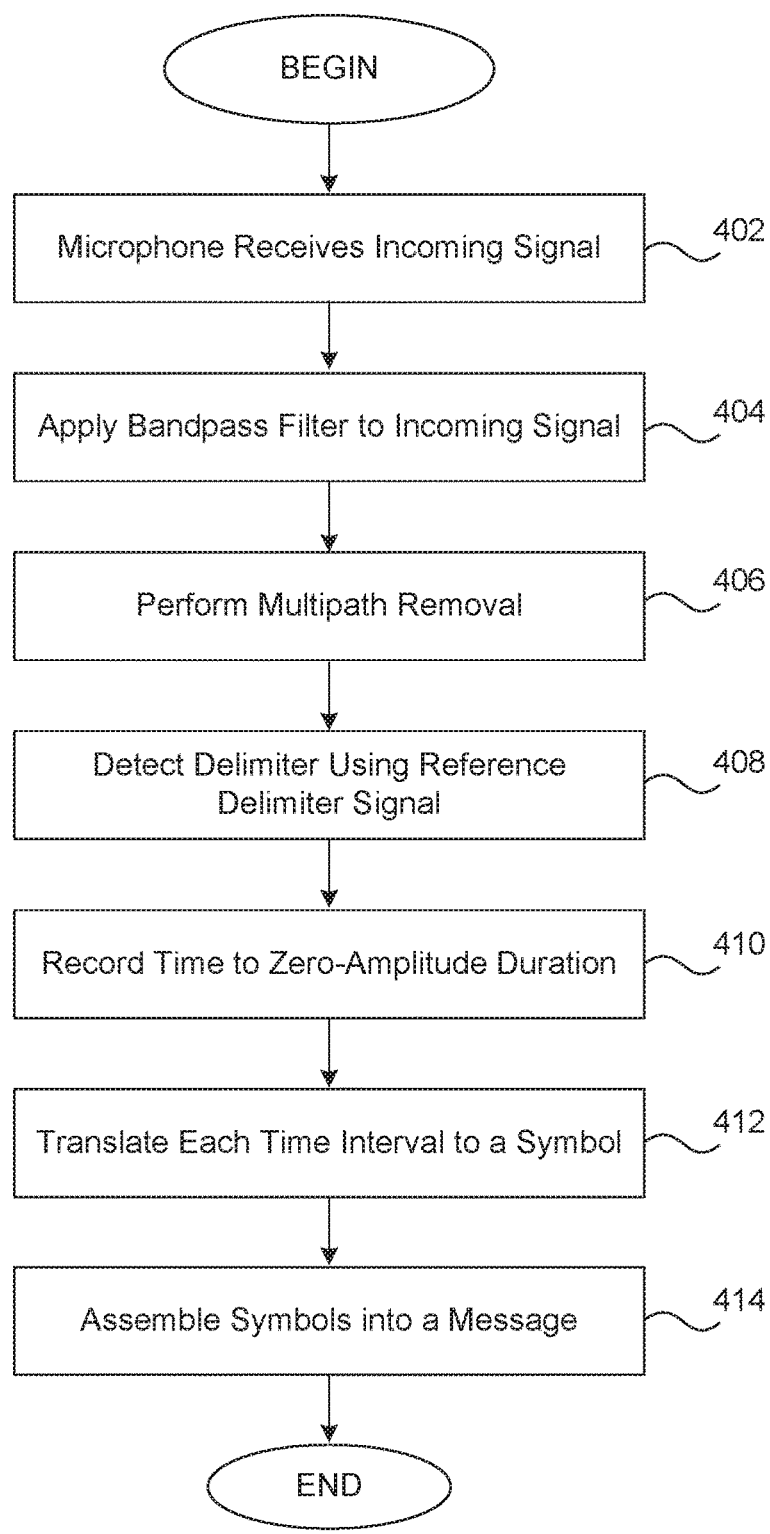
FIG. 4 is a flow diagram of a process of a device receiving an acoustic signal representing a message in accordance with one embodiment.

FIG. 4 is a flow diagram of a process of a device receiving an acoustic signal representing a message in accordance with one embodiment. At step 402 the microphone at the receiving device detects the incoming acoustic signal. The device records the incoming/arrival time of the signal. In the application of estimating the distance between two devices, the start time (arrival time) is the time the first delimiter is detected at the device. At step 404 the device applies a bandpass filter to the incoming signal to only let the frequency of the current channel pass through to overcome any effects of background noise.

At step 406 the device performs multipath removal. The acoustic signal may be reflected from surrounding object, arriving at the microphone from multiple paths. The reflected signal can arrive immediately after the line-of-sight signal (or shortest path signal) or may be delayed depending on the position of the reflecting object. A severely attenuated signal is removed as the correlation is smaller than the first incoming signals. A threshold of $0.5*\max(r)^2$ can be used to filter the small correlations.

At step 408 the receiving device detects the delimiter using a predetermined reference delimiter signal previously stored on the device. In one embodiment, detection is calculated by sliding a window of size w (set to be equal to the length of the delimiter) over the received signal. For each step (sliding the window for one sample), the device calculates the following correlation:

$$r(\tau)=\Sigma_i^w(x(i)-\mu_x)*(y(i+\tau)-\mu_y)/\sqrt{\Sigma_i^w(x(i)-\mu_x)^2 \Sigma_i^w(y(i+\tau)-\mu_y)^2}$$

where x is the reference delimiter and y is the incoming signal and $\tau$ is the distance between the start of the window and the start of the incoming signal.

At step 410 the duration time of the zero-amplitude transmission (silence) is recorded. This is the distance that is measured for the time between the start of two delimiters minus one delimiter length. At step 412 the duration time (e.g., 20 ms) is translated or mapped to a symbol or sequence of bits, according to a predefined table.

Figure 5:
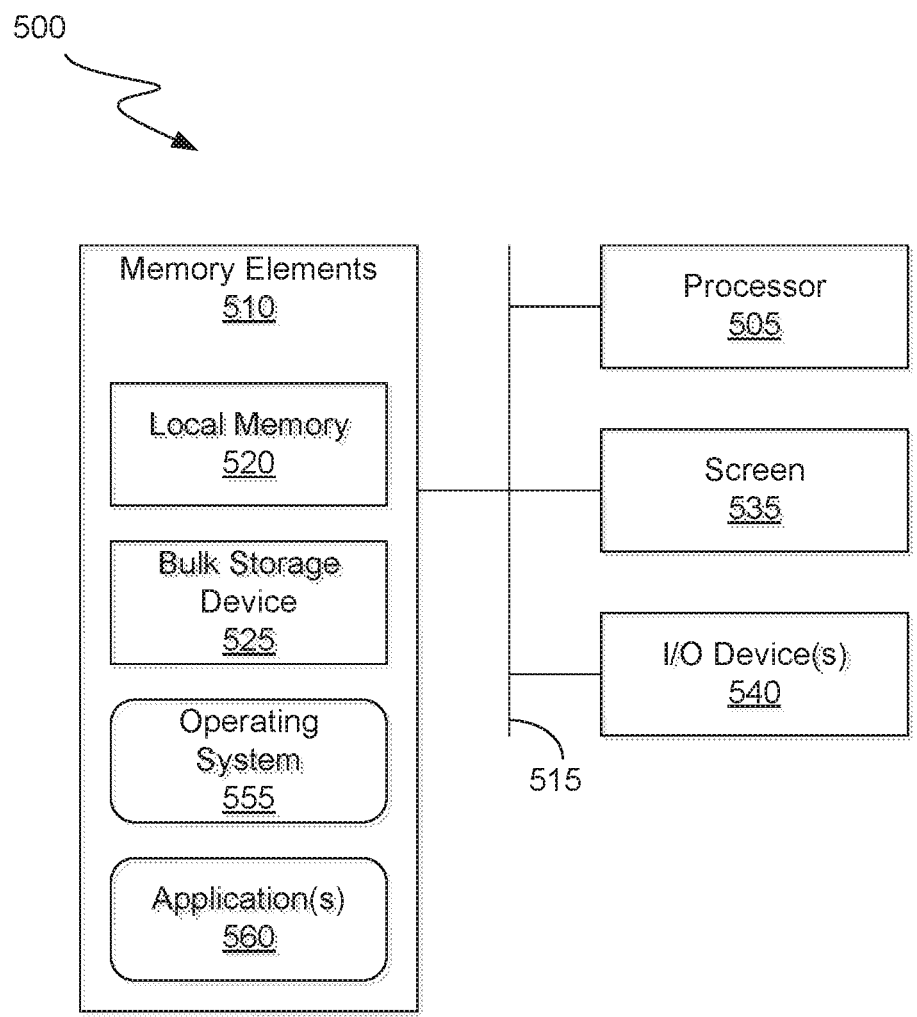
FIG. 5 is a block diagram showing components of a content viewing device in accordance with one embodiment.

FIG. 5 is a block diagram of a data processing system 500 in accordance with one embodiment. System 500 may be used to implement any of a variety of systems and/or computing devices that include a processor and memory and that are capable of performing the operations described within this disclosure. In one embodiment, it can be used to implement a smart watch or phone. It can also be used to execute computer instructions to implement the logic flowcharts in FIGS. 2 and 4. The device may be any device described in connection with FIGS. 1-4.

As pictured, system 500 includes at least one processor 505 coupled to memory elements 510 through a system bus 515 or other suitable circuitry such as an input/output (I/O) subsystem. System 500 stores program code within memory elements 510. Processor 505 executes the program code accessed from memory elements 510 via system bus 515. Memory elements 510 include one or more physical memory devices such as, for example, a local memory 520 and one or more bulk storage devices 525. Local memory 520 refers to random access memory (RAM) or other non-persistent memory device(s) generally used during actual execution of the program code. Bulk storage device 525 may be implemented as a hard disk drive (HDD), solid state drive (SSD), or other persistent data storage device. System 500 may also include one or more cache memories (not shown) that provide temporary storage of at least some program code in order to reduce the number of times program code must be retrieved from bulk storage device 525 during execution.

System 500 may be coupled to one or more I/O devices such as a screen 535 and one or more additional I/O device(s) 540. The I/O devices described herein may be coupled to system 500 either directly or through intervening I/O controllers. In one aspect, screen 535 may be implemented as a display device that is not touch sensitive. In another aspect, screen 535 may be implemented as a display device that is touch sensitive.

Examples of I/O device(s) 540 may include, but are not limited to, a universal remote control device, a keyboard, a mobile device, a pointing device, a controller, a camera, a speaker, and a microphone. In some cases, one or more of the I/O device(s) may be combined as in the case where a touch sensitive display device (e.g., a touchscreen) is used as screen 535. In that case, screen 535 may also implement a keyboard and a pointing device. Other examples of I/O devices 540 may include sensors. Exemplary sensors may include, but are not limited to, an accelerometer, a light sensor, touch screen sensors, one or more biometric sensors, a gyroscope, a compass, or the like.

I/O devices 540 may also include one or more network adapter(s). A network adapter is a communication circuit configured to establish wired and/or wireless communication links with other devices. The communication links may be established over a network or as peer-to-peer communication links. Accordingly, network adapters enable system 500 to become coupled to other systems, computer systems, remote printers, and/or remote storage devices, such as remote servers storing content. Examples of network adapter(s) may include, but are not limited to, modems, cable modems, Ethernet cards, wireless transceivers, whether short and/or long range wireless transceivers (e.g., cellular transceivers, 802.11x (Wi-Fi™) compatible transceivers, Bluetooth® compatible transceivers, and the like).

As pictured in FIG. 5, memory elements 510 may store an operating system 555 and one or more application(s) 560, such as applications for translating symbols and zero-amplitude time durations and symbol mapping tables. It may also store software for segmenting or breaking a message (to be transmitted) into pieces or segments that can be represented by symbols. In one aspect, operating system 555 and application(s) 560, being implemented in the form of executable program code, are executed by system 500 and, more particularly, by processor 505. As such, operating system 555 and application(s) 560 may be considered an integrated part of system 500. Operating system 555, application(s) 560, and any data items used, generated, and/or operated upon by system 500 are functional data structures that impart functionality when employed as part of system 500.

As noted, in one aspect, system 500 may be used to implement a smart phone, smart watch, or other type of wearable device. In another aspect, system 500 may be used to implement a computer, such as a personal computer, a server, or the like. Other examples of mobile computing devices may include, but are not limited to, a tablet computer, a mobile media device, a game console, a mobile internet device (MID), a laptop computer, a mobile appliance device, or the like.

System 500 may include fewer components than shown or additional components not illustrated in FIG. 5 depending upon the particular type of device that is implemented. In addition, the particular operating system and/or application(s) included may also vary according to device type as may the types of network adapter(s) included. Further, one or more of the illustrative components may be incorporated into, or otherwise form a portion of, another component. For example, a processor may include at least some memory.

Various embodiments described herein involve distinct features. It should be appreciated that any feature or functionality from one figure or embodiment may be incorporated into any other figure or embodiment.

Although only a few embodiments of the invention have been described in detail, it should be appreciated that the invention may be implemented in many other forms without departing from the spirit or scope of the invention. It should be appreciated that in some embodiments, one or more of the steps in the methods may be modified, reordered and/or deleted. Therefore, the present embodiments should be considered illustrative and not restrictive and the invention is not to be limited to the details given herein.

What is claimed is:

1. A method of communicating a message between a first device and a second device, comprising:
    mapping a segment of the message to a symbol;
    inserting one or more delimiters between symbols, each delimiter having a non-zero amplitude value;
        transmitting a first delimiter to the second device at a first time; and
        transmitting a second delimiter to the second device at a second time,
    wherein a time duration between the first time and the second time represents a first symbol in a plurality of symbols.

2. A method as recited in claim 1 wherein the time duration is a time difference between the first time of the first delimiter and the second time of the second delimiter minus a time length of single delimiter.

3. A method as recited in claim 1 further comprising:
    gradually increasing the starting amplitude of a delimiter; and
    gradually decreasing the ending amplitude of the delimiter.

4. A method as recited in claim 1 further comprising:
    including in the message a timestamp of when the message was transmitted and a time difference representing a distinctive symbol.

5. A method as recited in claim 4 further comprising dividing the message into one or more segments.

6. A method as recited in claim 5 wherein dividing the message into one or more segments further comprising using a logarithmic algorithm wherein each segment has $\log_2 N$ bits.

7. A method as recited in claim 1 wherein the time duration between the first time and the second time is longer than transmission time of a single delimiter.

8. A method as recited in claim 1 wherein mapping each segment of the message to a symbol further comprises:
   utilizing a symbol mapping table.

9. A method as recited in claim 1 wherein the plurality of symbols represents the message.

10. A method as recited in claim 1 further comprising dividing the message into one or more segments.

11. A device comprising:
   a speaker;
   a microphone;
   at least one processor;
   at least one memory component including a computer-readable storage medium arranged to store instructions wherein the instructions, when executed by the at least one processor, causes the device to:
   map a segment of a message to a symbol, wherein the message is being transmitted to a receiving device;
   insert one or more delimiters between symbols, each delimiter having a non-zero amplitude value;
   transmit a first delimiter to the receiving device at a first time; and
   transmit a second delimiter to the receiving device at a second time,
   wherein a time duration between the first time and the second time represents a first symbol in a plurality of symbols.

12. A device as recited in claim 11 wherein the instructions when executed by the at least one processor further causes the device to:
   gradually increase the starting amplitude of a delimiter; and
   gradually decrease the ending amplitude of the delimiter.

13. A device as recited in claim 11 wherein the instructions when executed by the at least one processor further causes the device to:
   include in the message a timestamp of when the message was transmitted and a time difference representing a distinctive symbol.

14. A device as recited in claim 11 wherein the instructions when executed by the at least one processor further causes the device to:
   divide the message into one or more segments.

15. A device as recited in claim 11 wherein the time duration is a time difference between the first time of the first delimiter and the second time of the second delimiter minus a time length of a single delimiter.

16. A method of communicating a message between a first device and a second device, comprising:
   detecting a first delimiter in an incoming signal;
   detecting second delimiter in the incoming signal;
   recording a time duration of zero-amplitude time between the first delimiter and the second delimiter;
   translating the time duration to a symbol; and
   assembling one or more symbols to form the message embedded in the incoming signal.

17. A method as recited in claim 16 wherein receiving an incoming signal further comprises:
   performing multi-path removal.

18. A method as recited in claim 16 wherein detecting a delimiter further comprises:
   comparing segments of the incoming signal with a reference delimiter using a sliding window.

19. A method as recited in claim 16 wherein translating the time duration to a symbol further comprises:
   utilizing a symbol mapping table.

20. A method as recited in claim 16 wherein computational capabilities of the first device and the second device are considered when communicating the message.

* * * * *